United States Patent [19]

Swanson et al.

[11] Patent Number: 5,748,093
[45] Date of Patent: May 5, 1998

[54] ELECTRICAL SURGE PROTECTION SYSTEM WITH CONDITION MONITORING

[75] Inventors: S. Keith Swanson; Tom Miller, both of Santa Barbara, Calif.

[73] Assignee: Joslyn Electronic Systems Corporation, Goleta, Calif.

[21] Appl. No.: 618,342

[22] Filed: Mar. 19, 1996

[51] Int. Cl.$^6$ .................................... G08B 21/00
[52] U.S. Cl. .................. 340/659; 340/660; 340/635; 340/642; 361/56; 361/91; 361/111; 361/118; 361/119
[58] Field of Search .................. 340/660, 662, 340/663, 635, 638, 642, 661; 361/56, 111, 91, 118, 119, 126, 127; 324/507, 550, 556

[56] References Cited

U.S. PATENT DOCUMENTS

| | | | |
|---|---|---|---|
| 4,539,487 | 9/1985 | Ishii | 307/44 |
| 4,543,566 | 9/1985 | Buck et al. | 340/512 |
| 4,740,859 | 4/1988 | Little | 361/56 |
| 4,907,118 | 3/1990 | Hames | 361/56 |
| 5,225,816 | 7/1993 | Lebby et al. | 340/653 |
| 5,278,771 | 1/1994 | Nyenya | 364/492 |
| 5,303,116 | 4/1994 | Grotz | 361/111 |
| 5,325,087 | 6/1994 | Mikli | 340/635 |
| 5,390,065 | 2/1995 | Allina et al. | 361/56 |
| 5,412,526 | 5/1995 | Kapp et al. | 361/56 |

OTHER PUBLICATIONS

ZoneMaster Series brochure, "A Revolutionary New Generation of Service Entrance & Main Panel Protection", Atlantic Scientific Corporation, 5 pages, Jan. 1993.

Joslyn Technical Data Preliminary Data Sheet, Surgitron® Diagnostic AC Surge Protector.

Joslyn Drawing, Figures 1 and 2, 1 sheet.

Primary Examiner—Jeffery Hofsass
Assistant Examiner—Julie B. Lieu
Attorney, Agent, or Firm—Marshall, O'Toole, Gerstein, Murray & Borun

[57] ABSTRACT

A surge protection system having a plurality of surge protection devices for the protection of a power line. Each of the surge protection devices may be in either a ready state in which the surge protection device provides surge protection or an inoperable state in which the surge protection device does not provide surge protection. The surge protection devices provide a level of surge protection which is based upon how many of the surge protection devices are in the ready state and how many of the surge protection devices are in the inoperable state. The surge protection system includes means associated with the surge protection devices for generating a signal indicative of the level of surge protection, and means coupled to the generating means for displaying a visual indication of the level of surge protection. The surge protection system may also be provided with means for sensing a voltage on the power line and means for generating a visual display indicative of the voltage. The system may also include means for determining when the sensed voltage varies from a nominal voltage by a threshold amount, such as means for determining voltage sags, swells, fractional cycle dropouts, and outages. When an outage is detected, the system may store data relating to various voltage conditions in a nonvolatile memory.

28 Claims, 8 Drawing Sheets

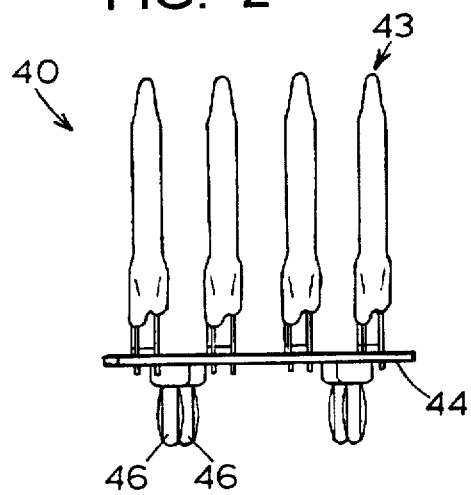
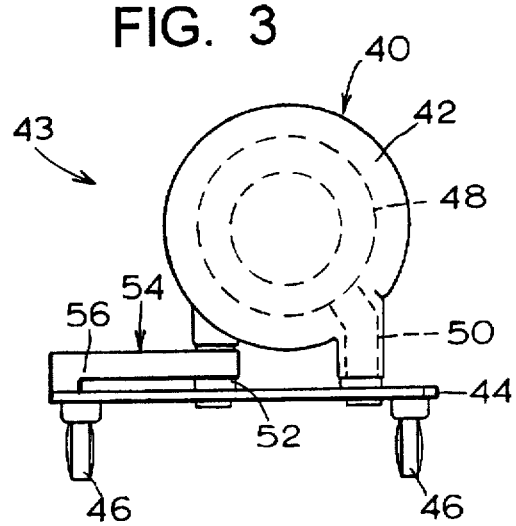
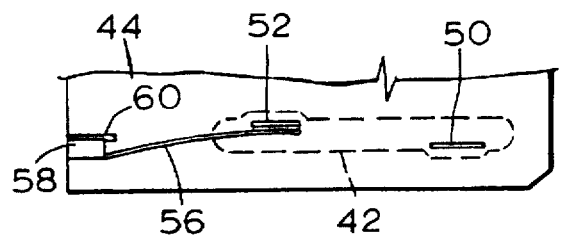
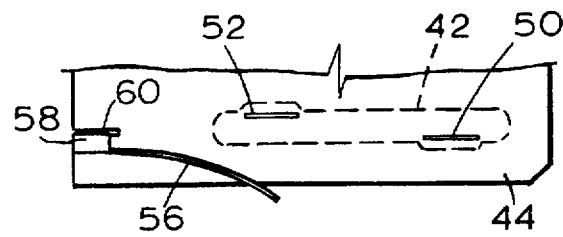
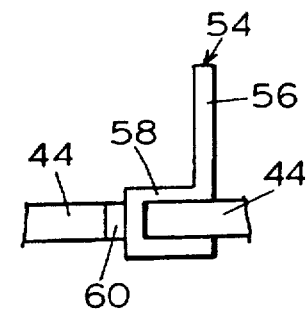
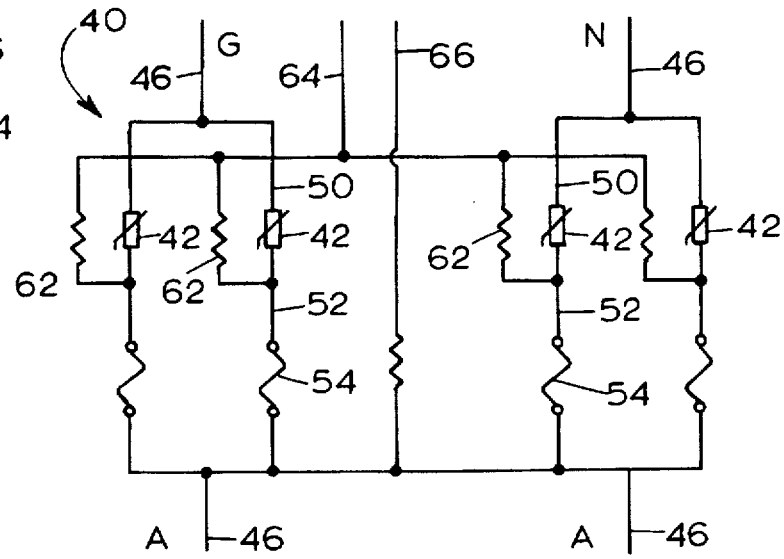

ELECTRICAL SURGE PROTECTION SYSTEM WITH CONDITION MONITORING

BACKGROUND OF THE INVENTION

The invention is directed to an electrical surge protection system having a plurality of individual surge protectors and means for generating a visual indication of the amount of surge protection remaining.

Surge protection devices are used to protect components and power systems from prolonged overvoltage surges, such as those caused by lightning for example. During a prolonged overvoltage surge, a surge protection device provides temporary surge protection of a component by shunting the power surge to ground or neutral. A prolonged overvoltage surge may cause a surge protector to overheat, thus presenting a fire hazard.

U.S. Pat. No. 4,907,118 to Hames discloses a surge protector adapted to plug into a wall socket. The surge protector includes a metal oxide varistor disposed with a plug body beneath a transparent polymer surface. A power surge causes the varistor to change color, e.g. from a light color to a dark color, which can be viewed through the transparent surface so that the user can, upon darkening of the varistor, replace the surge protector with a new one.

U.S. Pat. No. 5,325,087 to Mikli discloses a surge arrester having a stack of varistor blocks disposed within a housing, a fiber optic cable (which includes 200 optical fibers) wrapped around the exterior of the varistor blocks, and a monitor connected to the fiber optic cable. The monitor transmits light pulses through the optical fibers and detects the intensity of those light pulses when they return to the monitor after passing through the fibers. If the fibers are undamaged, the intensity of the received light pulses should be the same as that of the transmitted pulses. However, if the power monitor senses that the intensity of the received pulses falls below a certain level (due to melting or tearing of the optical fibers caused by damage to the blocks), it is assumed that the surge arrester has been damaged and should be replaced.

Where a conventional surge protection device is composed of a plurality of individual surge protectors, some of which are operable and others of which are inoperable, it is difficult, if not impossible, to determine how much surge protection is still available.

SUMMARY OF THE INVENTION

The invention is directed to a surge protection system having a plurality of surge protection devices for the protection of a power line. Each of the surge protection devices may be in either a ready state in which the surge protection device provides surge protection or an inoperable state in which the surge protection device does not provide surge protection. The surge protection devices provide a level of surge protection which is based upon how many of them are in the ready state and how many of them are in the inoperable state. The system includes means associated with the surge protection devices for generating a signal indicative of the level of surge protection, and means coupled to the generating means for displaying a visual indication of the level of surge protection.

The surge protection system may also be provided with means for sensing a voltage on the power line and means for generating a visual display indicative of the voltage. The system may also include means for determining when the sensed voltage varies from a nominal voltage by a threshold amount, such as means for determining voltage sags, swells, fractional cycle dropouts, and power outages. When a power outage is detected, the system may store data relating to various voltage conditions in a nonvolatile memory.

The means for generating a signal indicative of the level of surge protection may comprise a voltage-sensing circuit that generates a voltage signal relating to the number of the surge protection devices which are in the ready state, means for generating a comparison signal, such as an average voltage signal, from the voltage signal, and means for comparing the comparison signal with one or more threshold values. The voltage-sensing circuit may include a plurality of resistors, each of which is associated with a respective one of the surge protection devices, a half-wave rectifier, and an A/D converter circuit. The system may also include means for generating an alarm when the level of surge protection falls below a threshold value.

Where the surge protection system is utilized to protect a multi-phase power line, a surge protector module may be provided for each line of the multi-phase power line, with each surge protector module having a plurality of surge protection devices disposed therein.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 2 is a side elevational view of a surge protector module having four surge protection devices;

FIG. 3 is a front elevational view of the surge protector module of FIG. 2;

FIGS. 4A, 4B and 4C illustrate the operation of a thermal disconnect spring associated with one of the surge protection devices;

FIG. 5 is a circuit diagram of the surge protector module of FIGS. 2 and 3;

DETAILED DESCRIPTION OF A PREFERRED EMBODIMENT

Figure 1:
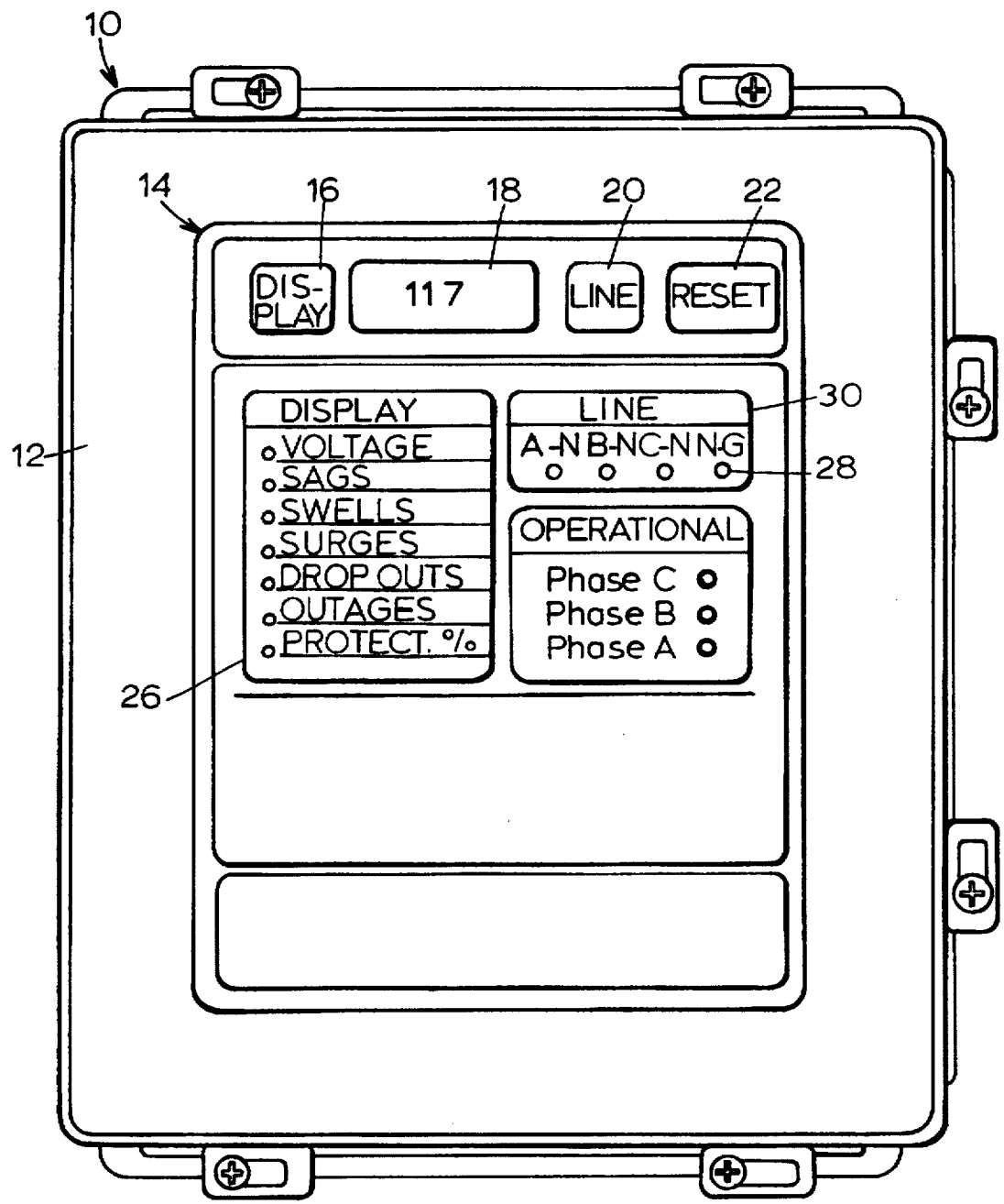
FIG. 1 illustrates the display panel of a preferred embodiment of a surge protection system.

Referring to FIG. 1, a preferred embodiment of a surge protection system 10 designed to be connected to the individual power lines of a multi-phase power line, which is typically composed of two or three power lines which have a common peak voltage of 120, 240, or 277 $V_{rms}$.

The surge protection system 10 has an outer housing 12 with a display portion 14 that includes a display-select button 16, a numeric LED display 18, a line-select button 20, and a reset button 22. The display-select button 16 controls which of seven power conditions is displayed in the numeric display 18. The seven power conditions, each of which has an LED 24 associated therewith, are shown in a display portion 26.

Each time the display-select button 16 is pressed, the LED 24 associated with the next power condition is illuminated, and the numeric value of that power condition is shown in the numeric display 18. For example, when the display-select button 16 is pressed until the LED 24 associated with "Voltage" in the display portion 16 is illuminated, the numeric value of the actual voltage on one of the lines of the multi-phase power line is shown in the display 18. When the protection (%) condition is similarly selected, the percent of the surge protection remaining for one of the lines is displayed.

The line-select button 20 allows the user to select one of the lines of the multi-phase power line for which the numeric value of the actual voltage or percent protection remaining will be displayed. The lines which may be selected by the user, each of which has an LED 28 associated therewith, are shown in a display portion 30. For example, to display the actual voltage on line B, the user would press the display-select button 16 until the LED 24 associated with "Voltage" is illuminated, and then press the line-select button 20 until the LED 28 associated with the B–N line is illuminated.

Referring to FIGS. 2 and 3, the surge protection system 10 incorporates a surge protector module 40 for each phase or line of the multi-phase power line. Each module 40 has four individual surge protection devices 43, each of which incorporates a conventional surge protector 42 in the form of a metal-oxide varistor (MOV), attached to a carrier in the form of a printed circuit board 44 having four electrically conductive connection prongs 46.

Referring to FIG. 3, each surge protector 42 has a pair of electrodes in the form of internal conductive rings 48 which are separated by a portion of metal oxide. The electrodes 48 and the metal oxide are covered by an insulating coating. Each of the electrodes 48 is electrically connected to one of a pair of terminals 50, 52, and the terminal 52 has a thermal disconnect mechanism attached to it in the form of a flexible conductor 54 and a portion of solder which conductively interconnects the end of the conductor 54 with the terminal 52. Other types of electrodes could be used.

As shown in FIGS. 3, 4A and 4C, the conductor 54 has a flat vertically disposed portion 56 integrally formed with a C-shaped anchor portion 58 (see FIG. 4C, which is an enlarged view of a portion of the substrate 44 showing the conductor 54) which is disposed in a slot 60 formed in the substrate 44 to anchor the conductor 54 to the substrate 44. The C-shaped portion 58 may be permanently fixed to the substrate 44 via solder or a low-resistance conductive adhesive.

The surge protection device 43 of FIG. 4A is shown in an intact or ready state in which the terminal 52 is conductively coupled to the end of the conductor 54. In the event an overvoltage surge of sufficient magnitude and duration occurs across the terminals 50, 52 of the surge protector 42, the heat due to the relatively large current passing through the metal oxide portions of the surge protector 42 will melt the solder holding the end of the conductor 54 to the terminal 52, whereupon the end of the conductor 54 will be forced away from the terminal 52, causing the surge protection device 43 to be in a disconnected or inoperable state, as shown in FIG. 4B.

The conductor 54 may be composed of any suitable conductive material that remains flexible at relatively high temperatures, such as a copper-beryllium alloy (e.g. 0.2% beryllium). The flexible conductor 54 may be provided with a predetermined spring bias or arc, or it may simply be a straight metal portion, the end of which is flexed towards the surge protector terminal and held in place against the surge protector terminal by solder.

A circuit diagram of one of the surge protector modules 40 (which are identical) is shown in FIG. 5. Referring to FIG. 5, the module 40 has two surge protectors 42 which have one terminal 50 connected to the neutral conductor of a multi-phase power line and the other terminal 52 connected to one of the power lines (in this case line A) via the conductors 54 (shown as fuses 54). The other two surge protectors 42 in the module 40 have one terminal 50 connected to a ground conductor and the other terminal 52 connected to the same power line via the conductors 54. Four resistors 62 with identical resistance values each have a first end which is connected to the junction between the terminals 52 and the conductors 54 and a second end connected to a voltage-sensing line 64. A second voltage-sensing line 66 is utilized to sense the voltage on the power line to which the module 40 is connected.

When one (or more) of the surge protection devices 43 transitions from the ready state to the inoperable state, the fuse 54 associated with that device 43 disconnects the associated surge protector 42 from the power line. As a consequence of such transition, the magnitude of the voltage on the line 64 changes.

In particular, it should be noted that the resistors 62 are connected in parallel (when the fuses 54 are intact) since the first end of each resistor 62 is connected to a first common point (the line 64) and the second end of each resistor 62 is connected to a second common point (the line voltage). Thus, when all four fuses 54 are intact, the combined resistance presented by all four resistors 62 is ¼R, where R is the resistance value of each resistor 62.

However, when a fuse 54 is disconnected, the resistor 52 associated with that fuse 54 is effectively removed from the circuit, so that the combined resistance of the remaining three resistors 52 is ⅓R. Similarly, when only two fuses 54 are intact, the combined resistance of the remaining two resistors 52 is ½R. When only one fuse 54 is intact, the resistance is R. Finally, when no fuses 54 are intact, the resistance is infinite.

Since the combined resistance of the remaining resistors 52 is inversely related to the voltage on the line 64 (current flows through the resistors 62 and the line 64 to a half-wave rectifier circuit 106 described below), the number of surge protection devices 43 which are in the ready state can be determined based on the magnitude of the voltage sensed on the line 64, as described in more detail below.

Figure 6:
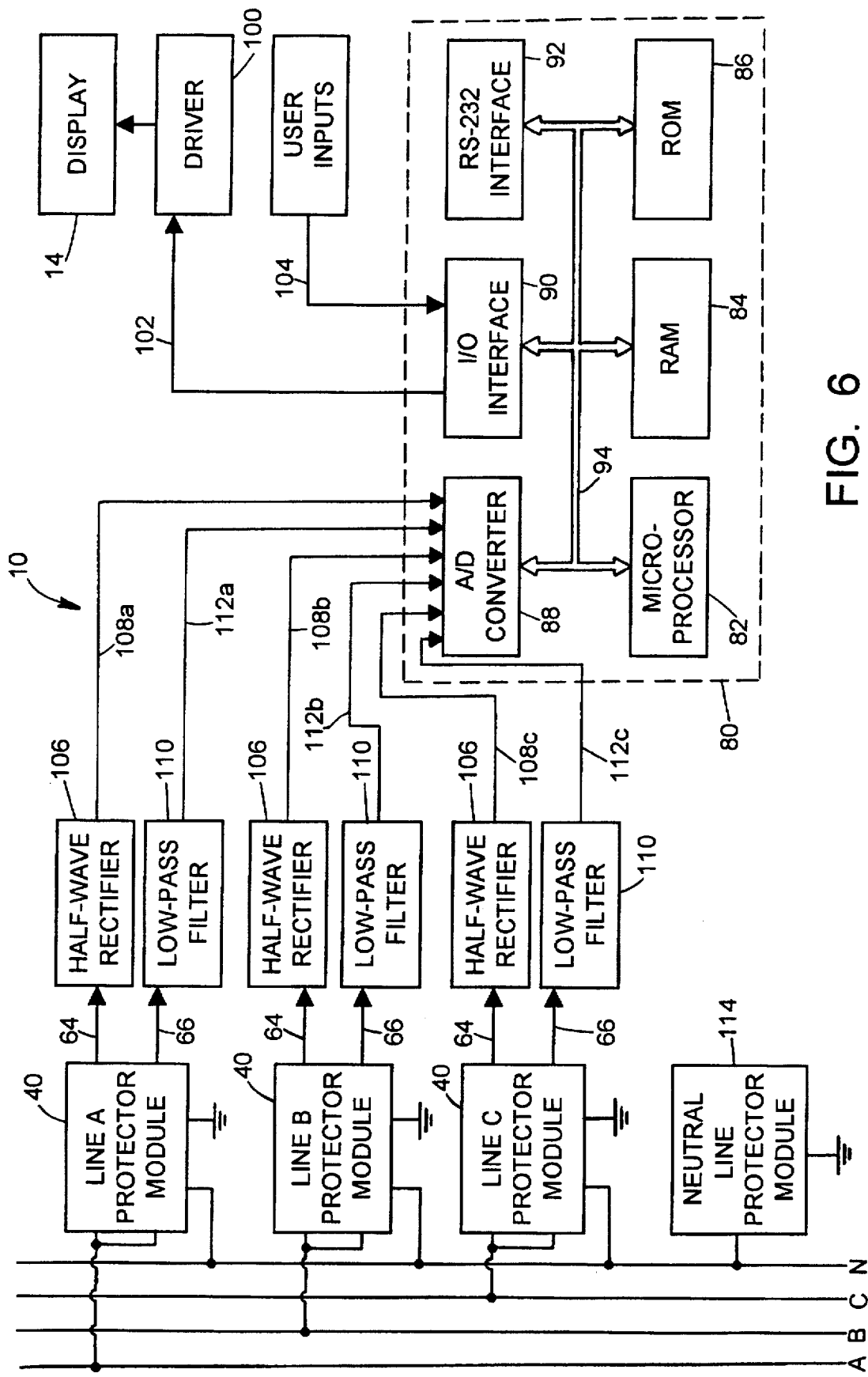
FIG. 6 is a block diagram of the electronics of the surge protection system.

A block diagram of the electronics of the surge protection system 10 is shown in FIG. 6. Referring to FIG. 6, the system 10 has a microcontroller 80, such as a Motorola 6811 microcontroller, having a microprocessor 82, a random-access memory (RAM) 84, a read-only memory (ROM) 86, an analog-to-digital (A/D) converter 88, an I/O interface 90, and an RS-232 interface 92, all of which are interconnected by an address/ data bus 94.

The I/O interface 90 is connected to a display driver circuit 100 via a multi-signal line 102 and receives electronic input from a user (from the display-select button 16, the line-select button 20 and the reset button 22) via a multi-signal line 104. The RS-232 interface 92 may be used to conduct data communications with a device at a location remote from the surge protection system 10.

A half-wave rectifier circuit 106 is connected to the voltage-sensing line 64 of each surge protector module 40. Each rectifier 106, which generates a half-wave rectified signal which is supplied to the A/D converter 88 via one of three respective lines 108a–108c, is in the form of a diode connected to three resistors in series (not shown). Each of the lines 64 is connected to the input of one of the diodes; the three resistors of each rectifier 106 are connected to the neutral conductor of the multi-phase power line; and each of the lines 108a–108c is connected to a respective junction between the diode and the resistors of each rectifier 106.

A low-pass filter circuit 110 is connected to the voltage-sensing line 66 of each surge protector module 40. Each filter 110, which may be a conventional low-pass filter circuit having an operational amplifier (not shown), is connected to the A/D converter 88 via one of three respective lines 112a–112c.

The system 10 may also have a protector module 114 coupled between the neutral conductor of the multi-phase power line and ground. The neutral conductor protector module 114 may be composed of a 150 volt metal oxide varistor and a 270 volt spark gap connected in parallel between the neutral conductor and ground.

OVERALL OPERATION

Figure 7:
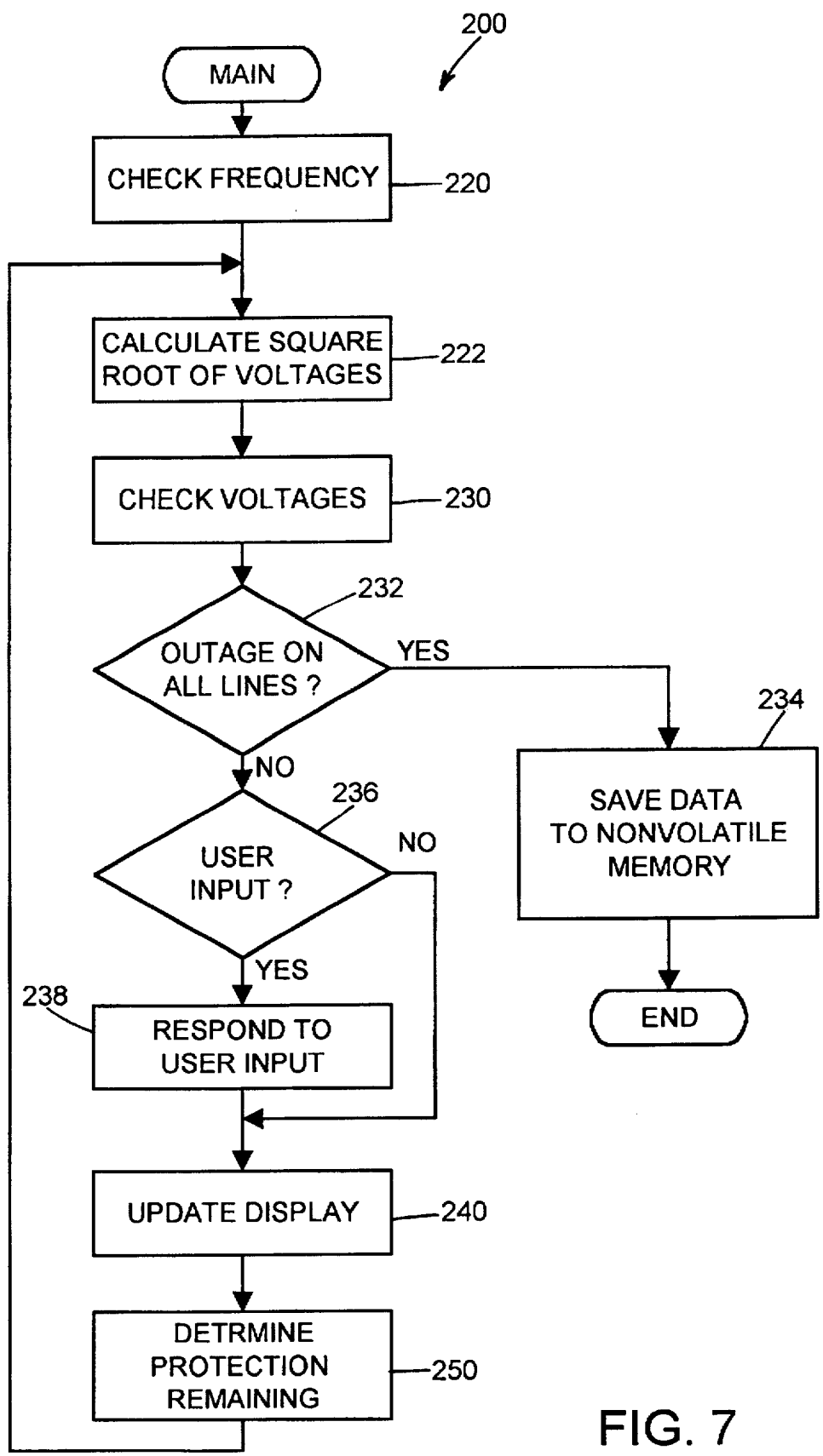
FIG. 7 is a flowchart of the main operating routine of the surge protection system.

FIG. 7 illustrates a flowchart of a main operating routine 200 of a computer program stored in the ROM 86 which is executed by the microprocessor 82 to control the operation of the system 10. Referring to FIG. 7, the first task that is performed by the system 10, which occurs at step 220, is to check the frequency of the alternating current (AC) waveforms on the multi-phase power line to which the system 10 is attached, which frequency is either 50 or 60 Hz. After the frequency is determined at step 220, the remaining portion of the routine 200 is performed approximately synchronously with the frequency. Thus, where the frequency is 60 Hz, steps 222–250 would be repeated once every 16.7 milliseconds.

At step 222, the root-mean-square (RMS) value of the voltages sensed on the three power lines are calculated, based on a read voltages routine that periodically reads the voltages supplied to the A/D converter 88 via the lines 112a–112c, as described below.

At step 230, the three voltages calculated at step 222 (one voltage for each power line) are checked for various conditions, such as whether the voltages are above or below their expected nominal levels.

At step 232, if there was a power outage on all three power lines (if the outage count of step 342 of FIG. 10 equals three), the program branches to step 234 where data regarding the various voltage conditions is stored in a nonvolatile memory (not shown) so that the data is not lost due to power loss to the system 10.

At step 236, if the system 10 detects that the user pressed one of the buttons 16, 20, 22, the system 10 responds appropriately to the user input at step 238. At step 240, the display 14 is updated by changing (if necessary) the numeric value of the voltage condition displayed in the numeric display 18. At step 250, the system 10 determines the amount of surge protection that is remaining, based on the magnitudes of the voltages sensed on the three lines 64, as described in more detail below.

CHECK FREQUENCY ROUTINE

Figure 8:
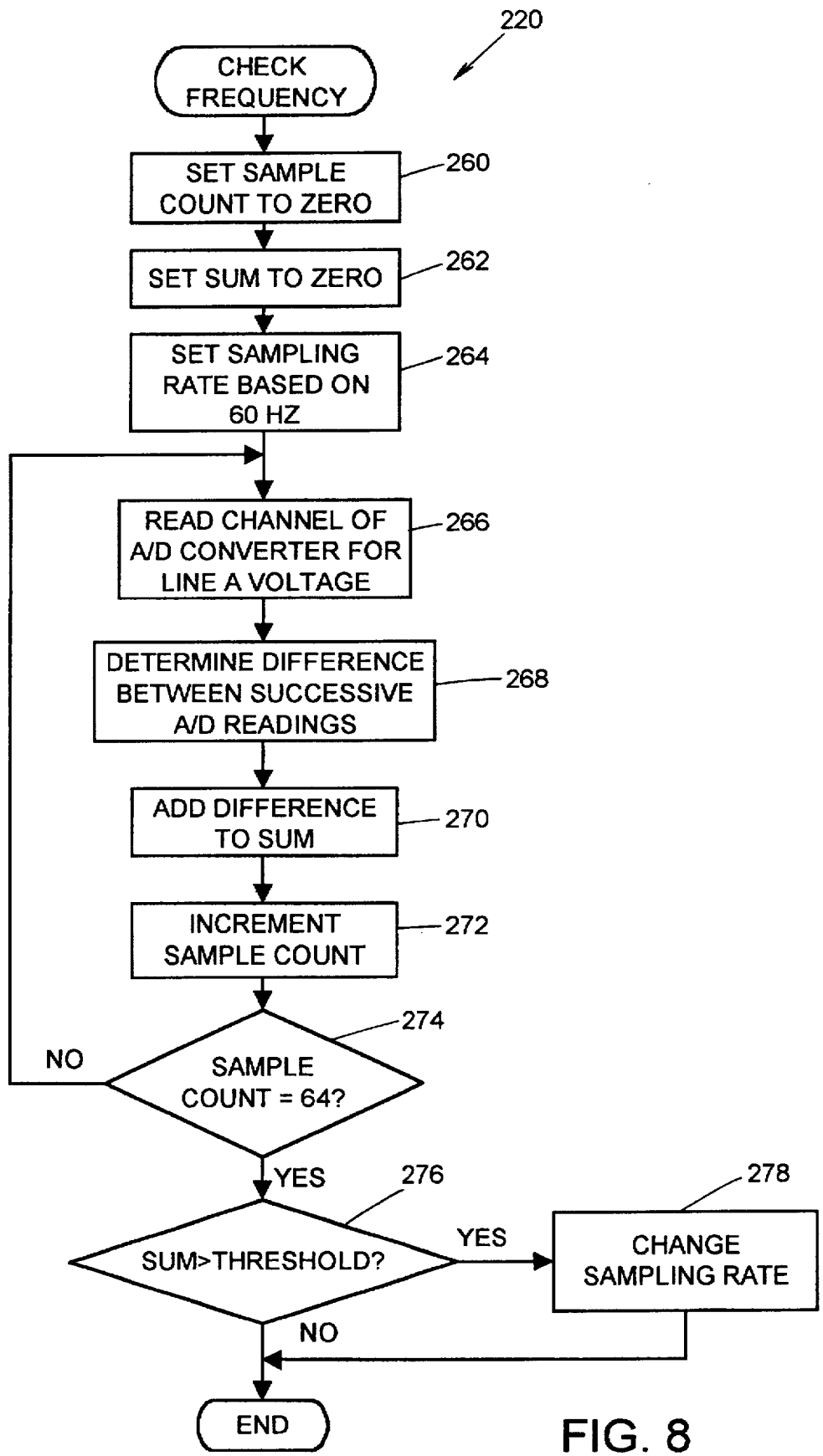
FIG. 8 is a flowchart of a check frequency routine shown schematically in FIG. 7.

FIG. 8 is a flowchart of a check frequency routine shown schematically in FIG. 7 as step 220. The theory of operation of the frequency check routine 220 is that if an AC waveform is sampled at the same time during each periodic cycle (i.e. the sampling frequency is the same of the frequency of the AC waveform), then all the samples should have substantially the same magnitude. The routine 220 determines whether all samples are substantially the same by repeatedly determining the difference in magnitude between successive samples, summing those differences, and determining whether the sum of the differences of all the samples falls below a threshold limit. If it does, then the sampling rate is assumed to correspond with the frequency of the AC waveform.

Referring to FIG. 8, the frequency check routine 220 begins operation at step 260 by setting a sample count to zero (64 samples of the voltage on line A are taken). At step 262, a sum variable is set to zero, and at step 264 the sampling rate is initially set to correspond to 60 Hz. In this case, the sampling rate is 60 Hz×64 samples per cycle, or 3.84 kHz.

Steps 266–274 are then repeated until all the voltage samples of line A are processed. At step 266, the channel of the A/D converter 88 connected to the voltage-sensing line 112a is read. At step 268, the current voltage magnitude (i.e. the voltage magnitude just read from the A/D converter 88 at step 266) is subtracted from the previous voltage magnitude to determine the difference between the successive voltage readings. At step 270, that difference is added to the sum variable (which was set to zero at step 262), and at step 272, the sample count is incremented. At step 274, if the sample count does not equal 64, meaning that not all samples have been taken, the program repeats steps 266–274.

At step 276, if the accumulated sum of all magnitude differences between adjacent voltage samples is greater than a predetermined threshold, in which case it is assumed that the sampling frequency was not the same as the frequency of the AC waveform on line A of the multi-phase power line, then the program branches to step 278 where the sampling rate is changed to correspond to a 50 Hz waveform (which is the only other frequency option besides 60 Hz). In this case, the sampling rate is 50 Hz×64 samples per cycle, or 3.2 kHz. Otherwise, the sampling rate is maintained to correspond with a 60 Hz waveform.

READ VOLTAGES ROUTINE

Figure 9:
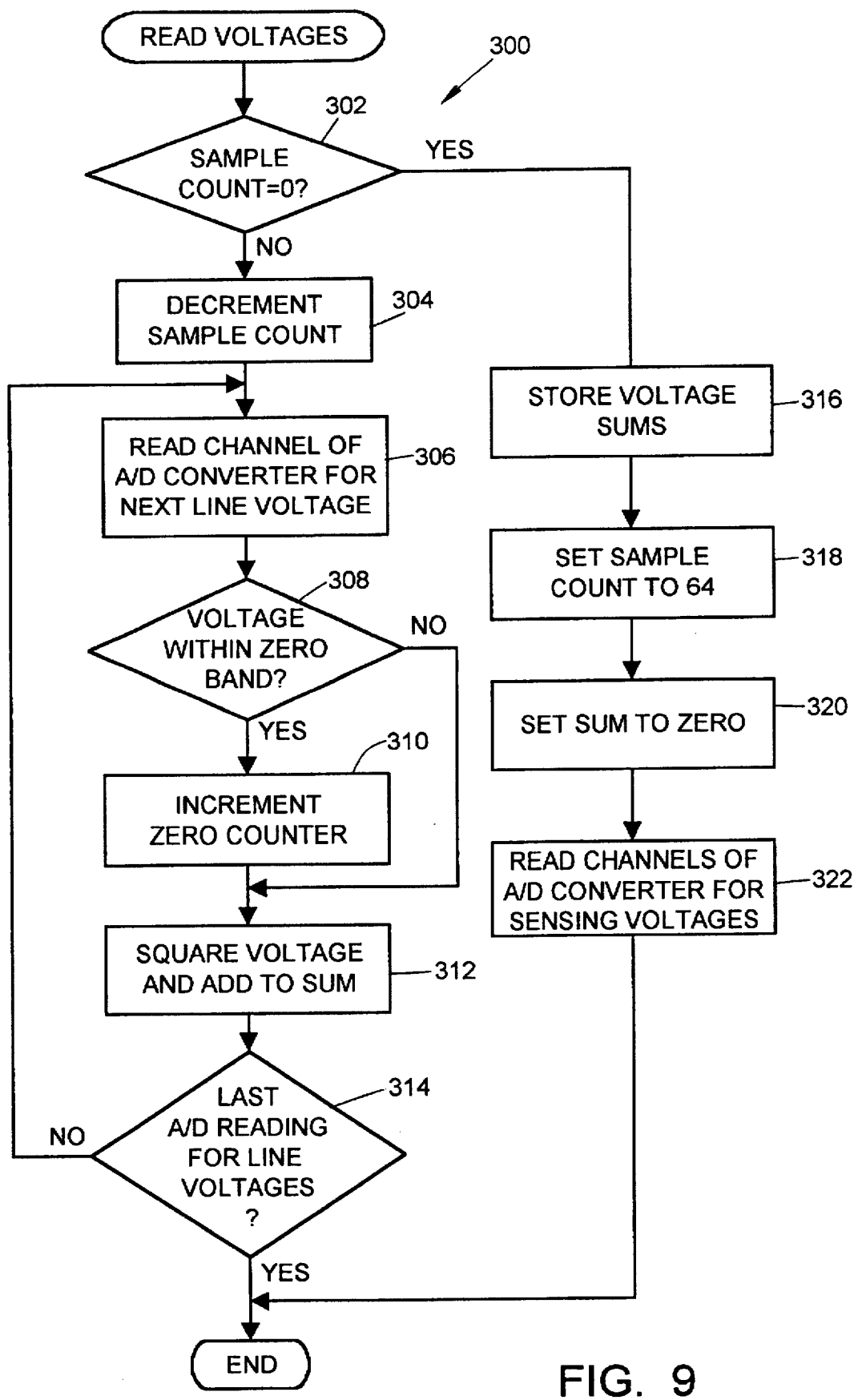
FIG. 9 is a flowchart of a read voltages routine shown schematically in FIG. 7.

FIG. 9 is a flowchart of a read voltages routine 300 which periodically reads the voltages provided to the A/D converter 88 via the voltage-sensing lines 108, 112. The routine 300 may be an interrupt service routine, the performance of which is periodically triggered by an interrupt signal generated by a clock circuit, for example. The routine 300 takes 64 voltage samples for each cycle of the AC waveforms on the voltage-sensing lines 112a–112c (where the frequency of the AC waveforms is 60 Hz, the routine 300 is performed approximately every 260 microseconds) and one voltage sample for each cycle of the half-wave rectified waveforms on the voltage-sensing lines 108a–108c.

Referring to FIG. 9, at step 302, if the sample count (which was set to 64 in step 318 during the prior execution of the routine 300) is not zero, meaning that another voltage sample of one of the lines 112a–112c should be taken, the program branches to step 304, where the sample count is decremented by one.

At step 306 a first channel of the A/D converter 88 is read to obtain a binary sample of the voltage on one of the voltage-sensing lines 112a–112c. At step 308, the program checks to determine whether the magnitude of the binary sample is zero by determining whether it is within a predetermined zero band defined by upper and lower binary limits. For example, for an A/D converter that generates an 8-bit output signal having a maximum positive value of +128 and a maximum negative value of −127, the zero band could be defined to have an upper binary limit of +2 and a lower binary limit of −2.

If the voltage sample falls within that zero band, it is assumed that the magnitude of the voltage sample is zero, in which case the program branches to step 310 where a zero counter is incremented. The count of the zero counter is later used to detect the presence of a fractional cycle dropout (i.e. an unexpected relatively short duration zero voltage). A normal voltage signal having no fractional cycle dropouts should generate a relatively small number of zero counts since the corresponding AC waveform passes through the zero axis twice for each full cycle. A zero count greater than that relatively small number indicates the presence of one or more fractional cycle dropouts.

At step 312, the magnitude of the voltage sample taken at step 306 is squared and then added to an accumulating sum. Step 312 performs the first two steps necessary to calculate the RMS voltage, which is the square root of the sum: $V_1^2 + V_2^2 + V_3^2 + V_4^2 \ldots$, where each $V_x$ is the magnitude of one of a number of successive voltage samples (the final step in calculating the RMS voltage is step 222 of FIG. 7).

Steps 306–314 are performed once for each line, i.e. if the multi-phase power line has three lines, the A/D converter 88 is read three times to obtain a single sample of each line voltage. At step 314, if all three line voltage samples have been obtained, then the routine ends.

If the sample count was zero as determined at step 302, meaning that the routine 300 has been performed 64 times and all 64 samples of the voltage on the three lines 112a–112c have been taken, the program branches to step 316 where the accumulated sum (the sum calculated in step 312 during the prior execution of the routine 300) for each of the three line voltages is stored. At step 318, the sample count is set to 64, and at step 320, the accumulated sum is reset to zero since a new set of 64 voltage samples will be started the next time the routine 300 is initiated.

At step 322, the A/D converter 88 is read three times to obtain samples of the half-rectified voltages on the voltage-sensing lines 108a–108c. It should be noted that step 322 is performed every 65th time the routine 300 is performed (only after the sample count counts down from 64 to zero) so that the three half-wave rectified waveforms on the lines 108a–108c (which have the same frequency as the AC waveforms on the lines 112a–112c) are sampled slightly less than about once per cycle, and thus the sampling frequency is lower than the frequency of the half-wave rectified waveforms. The voltage samples taken at step 322 are subsequently used to determine the amount of surge protection remaining, as described in more detail below.

CHECK VOLTAGES ROUTINE

Figure 10:
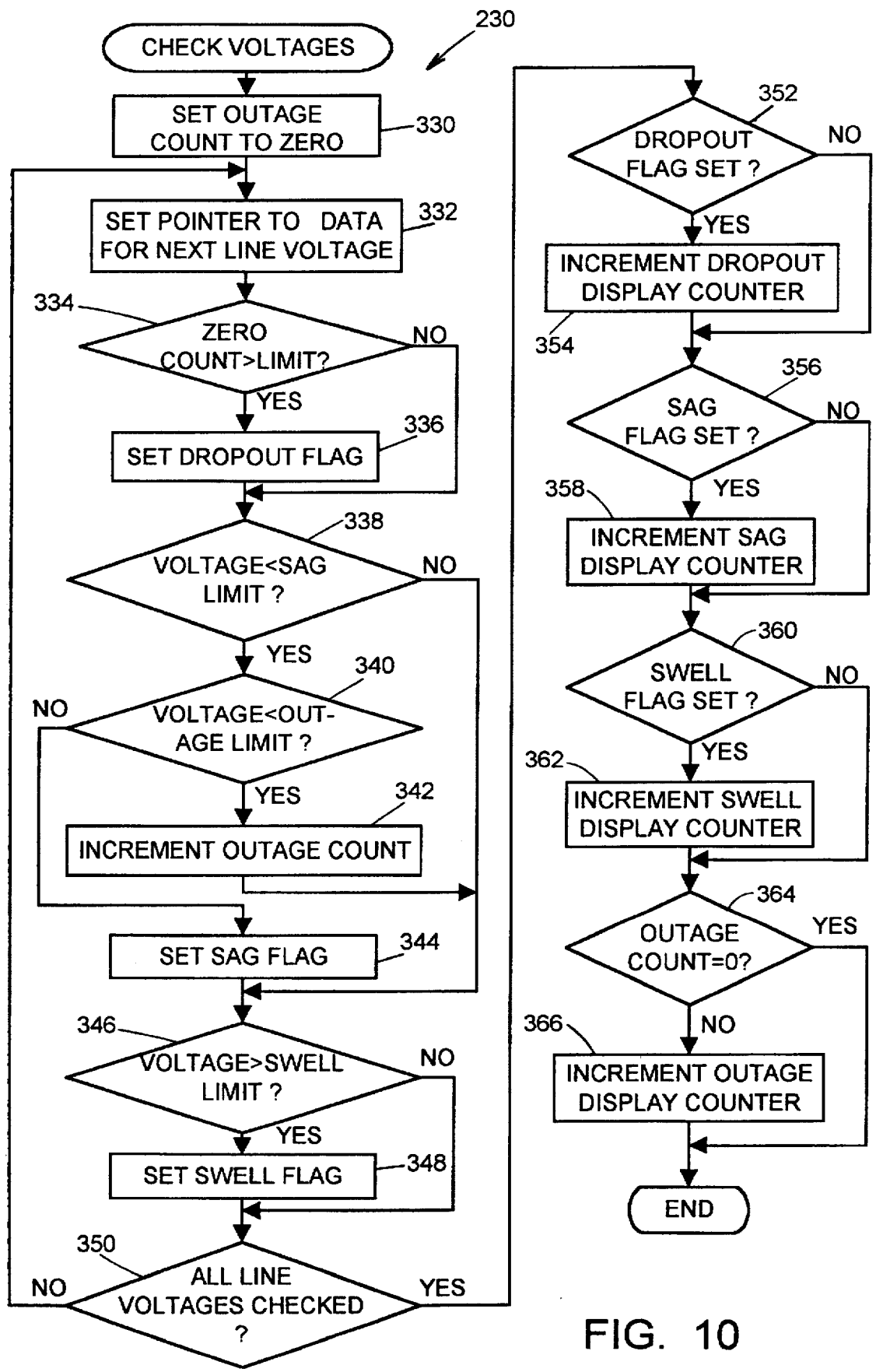
FIG. 10 is a flowchart of a check voltages routine shown schematically in FIG. 7.

FIG. 10 is a flowchart of a check voltages routine shown schematically in FIG. 7 as step 230. The check voltages routine 230 periodically checks the RMS voltage, calculated at step 222 of FIG. 7, for each line of the three-phase power line to determine whether the voltages are within normal operating limits.

At step 330, an outage count is set to zero. The outage count keeps track of the number of lines of the multi-phase power line for which a power outage was detected.

At step 332, a pointer is set to retrieve the data for the next (or first) line voltage. At step 334, if the zero count for that line is greater than a predetermined limit, the program branches to step 336 where a dropout flag is set, indicating the presence of a fractional cycle dropout, as described above.

Step 338 determines whether the RMS voltage for that line (as calculated at step 222 of FIG. 7) is less than a predetermined limit, such as 90% of the expected nominal RMS voltage, to detect the presence of a voltage "sag." If the voltage is less than the sag limit, the program branches to step 340, where the voltage is compared with an outage limit, such as 10% of the expected nominal voltage, to detect the presence of a power outage. If the voltage is less than the outage limit, the program branches to step 342, where the outage count initialized to zero at step 330 is incremented by one. If the voltage is not less than the outage limit as determined at step 340 (but is less than the sag limit as determined at step 338), the program branches to step 344 where a sag flag is set to indicate the presence of a voltage sag.

Step 346 determines whether the RMS voltage for that line is greater than a predetermined limit, such as 110% of the expected nominal voltage, to detect the presence of a voltage "swell." If the voltage is greater than the swell limit, the program branches to step 348, where a swell flag is set to indicate the presence of a voltage swell.

At step 350, if the RMS voltages for all three lines of the power line have not been checked, the program branches back to step 332. Otherwise, at step 352, if the dropout flag was set at step 336 pursuant to the detection of a fractional cycle dropout in any one of the three lines, a dropout display counter (which is a software counter) is incremented at step 354. The count specified by the dropout display counter is displayed in the numeric display 18 when the select-display button 16 is used to illuminate the LED 24 associated with "Dropouts" in the display portion 26 (see FIG. 1).

It should be noted that the dropout display counter is incremented at step 354 if a fractional cycle dropout was detected in any of the three lines of the multi-phase power line. Consequently, when the user elects to have the number of dropouts displayed (via the display-select button 16), the number of dropouts is the same for all three lines, and all four LEDs 28 in the display portion 30 are illuminated (in this case, the line-select button 20 is ineffective since the display 18 relates to all lines).

At step 356, if the sag flag was set at step 344 pursuant to the detection of a voltage sag in any one of the three lines, a sag display counter is incremented at step 358. The count specified by the sag display counter is displayed in the numeric display 18 when the select-display button 16 is used to illuminate the LED 24 associated with "Sags" in the display portion 26 (see FIG. 1). When voltage sags are selected, all LEDs 28 in the display portion 30 are illuminated since the sags relate to all lines.

At step 360, if the swell flag was set at step 348 pursuant to the detection of a voltage swell in any one of the three lines, a swell display counter is incremented at step 362. The count specified by the swell display counter is displayed in the numeric display 18 when the select-display button 16 is used to illuminate the LED 24 associated with "Swells" in the display portion 26. When voltage swells are selected, all LEDs 28 in the display portion 30 are illuminated since the swells relate to all lines.

At step 364, if the outage count (controlled by steps 330, 342) is not equal to zero, meaning that there was a power outage in at least one of the three lines, an outage display counter is incremented at step 366. That count is displayed in the numeric display 18 when the select-display button 16 is used to illuminate the LED 24 associated with "Outages" in the display portion 26. When power outages are selected, all LEDs 28 in the display portion 30 are illuminated since the outages relate to all lines.

DETERMINE PROTECTION REMAINING ROUTINE

Figure 11:
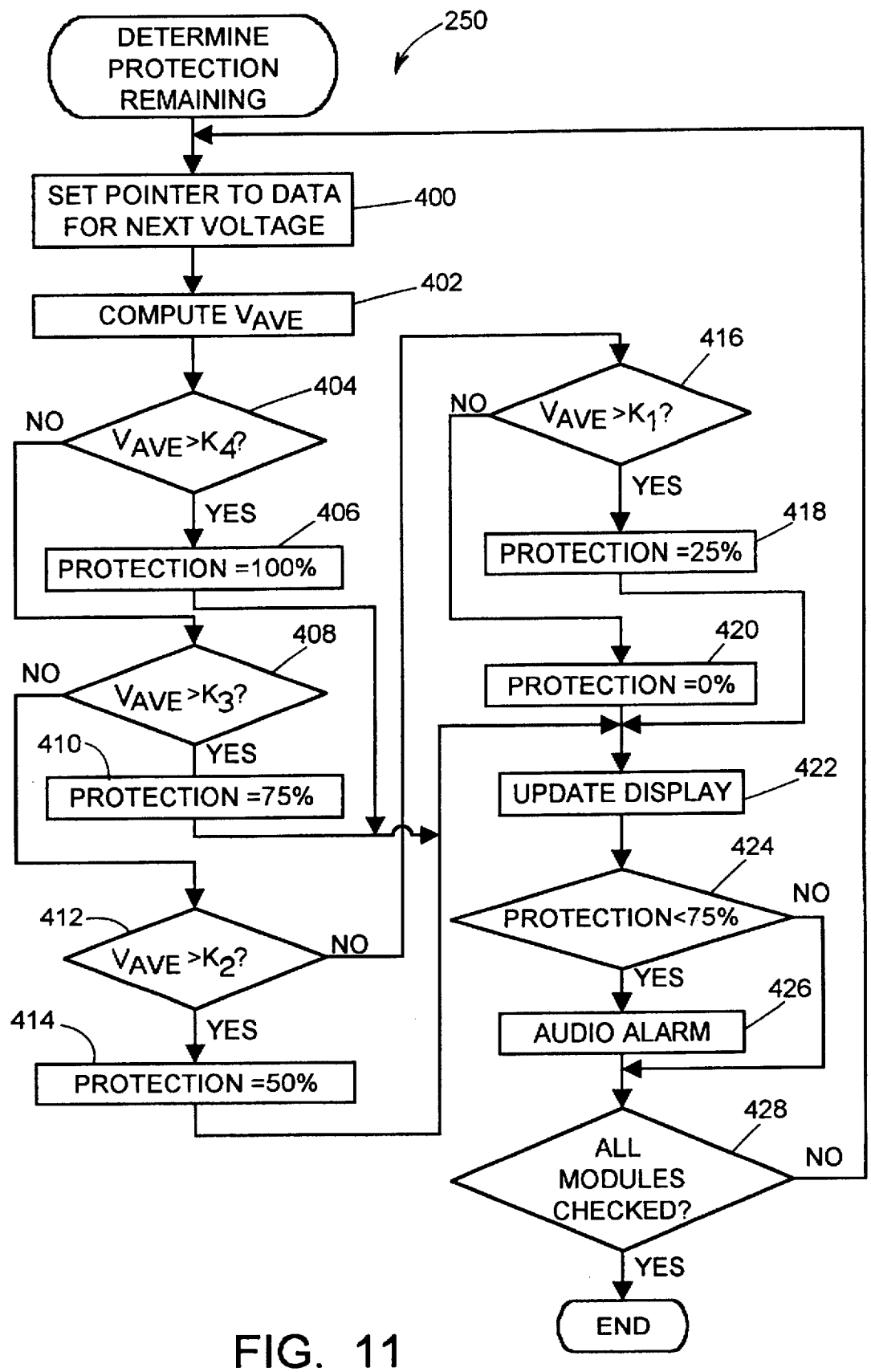
FIG. 11 is a flowchart of a determine protection remaining routine shown schematically in FIG. 7.

FIG. 11 is a flowchart of the determine protection remaining routine shown schematically as step 250 in FIG. 7. The routine 250 utilizes a weighted running average of the voltages generated on the voltage-sensing lines 108a–108c to determine the amount of surge protection remaining in each of the surge protector modules 40. Referring to FIG. 11, steps 400–428 are performed once for each surge protector module 40 that protects a line of the multi-phase power line.

At step 400, a pointer is set to retrieve the voltage data for the surge protector module 40 that protects one of the lines of the multi-phase power line. This data includes the most recent voltage for that line, which was read at step 322 of the read voltages routine 300 (FIG. 9), and the average voltage that was calculated during the previous performance of step 402 of the routine 250.

At step 402, the weighted average voltage $V_{ave}$ is determined in accordance with the following equation:

$$V_{ave} = C_1 V_s + C_2 V_{ave-1},$$

where $C_1$ is a constant, such as $1/256$, where $V_s$ is the latest sample voltage obtained during step 322 of FIG. 9, where $C_2$ is a constant, such as $255/256$, and where $V_{ave-1}$ is the voltage average calculated during the previous execution of step 402.

As noted above, the rate at which the voltage samples $V_s$ are generated is slightly different (slower) than the frequency of the half-wave rectified waveforms on the lines 108a–108c. The practical consequence of generating the $V_s$ samples at a slightly different rate is that it does not matter where in the cycle of the rectified waveform the sampling takes place. For example, if the sampling rate was the same as the waveform frequency, then all samples would be taken at the same relative place in the waveform, for example, at the peak of the waveform. In that case, the system would require some type of means for determining the point in the waveform at which the samples were being taken.

However, by using a weighted average of voltage samples $V_s$ taken at a slightly different frequency than the waveform frequency, the magnitude of the weighted average over time is indicative of the number of surge protection devices 43 that are in the ready state, since the magnitude of each $V_s$ sample depends upon how many of the surge protection devices 43 in each module 40 are in the ready state.

At step 404, the voltage average $V_{ave}$ computed at step 402 is compared with a first, relatively high voltage threshold $K_4$. It should be noted that, if all four surge protection devices 43 of the module 40 are in the ready state, the four resistors 62 will have a relatively low combined resistance of $¼R$, and consequently the average voltage on the line 64 will be relatively high since there is only a relatively small voltage drop across the resistance $¼R$. If $V_{ave}$ is greater than the $K_4$ threshold, it is assumed that all four surge protection devices 43 are in their ready state, and thus that the surge protection remaining for that module 40 is 100%, in which case the program branches to step 406 where the protection remaining is set to 100%.

At step 408, the voltage average $V_{ave}$ computed at step 402 is compared with a second, somewhat lower voltage threshold $K_3$ ($K_3 < K_4$). If only three of the four surge protection devices 43 of the module 40 are in the ready state, the three corresponding resistors 62 will have a combined resistance of $⅓R$, and consequently the average voltage on the line 64 will be somewhat lower due to the larger voltage drop across the combined resistance $⅓R$. If $V_{ave}$ is greater than the $K_3$ threshold (but less than $K_4$), it is assumed that three of the four surge protection devices 43 are in their ready state, and the program branches to step 410 where the protection remaining is set to 75%.

At step 412, the voltage average $V_{ave}$ computed at step 402 is compared with a third, lower voltage threshold $K_2$ ($K_2 < K_3$). If only two of the four surge protection devices 43 of the module 40 are in the ready state, the two corresponding resistors 62 will have a combined resistance of $½R$, and consequently the average voltage on the line 64 will be lower due to the larger voltage drop across the combined resistance $½R$. If $V_{ave}$ is greater than the $K_2$ threshold (but less than $K_3$), it is assumed that only two of the four surge protection devices 43 are in their ready state, and the program branches to step 414 where the protection remaining is set to 50%.

At step 416, the voltage average $V_{ave}$ is compared with a fourth relatively low voltage threshold $K_1$ ($K_1 < K_2$). If only one of the four surge protection devices 43 is in the ready state, the single resistor 62 will have a resistance of R, and consequently the average voltage on the line 64 will be lower still. If $V_{ave}$ is not greater than the $K_1$ threshold as determined at step 416, it is assumed that none of the four surge protection devices 43 is in its ready state, and the program branches to step 420 where the protection remaining is set to 0%.

At step 422, the numeric display 18 is updated to reflect the amount of surge protection remaining. When the display-select button 16 is set to illuminate the LED 24 associated with "Protection %" in the display portion 26, the percentage of surge protection remaining is shown in the numeric display 18 for the surge protection module 40 specified by the line-select button 20.

At step 424, if the amount of surge protection just calculated is below 75%, the program branches to step 426 where an audio alarm is generated to warn the user of that fact. In addition to generating an audio alarm at step 426, an optional remote monitoring relay could be activated to generate a warning signal. The monitoring relay could be provided with a predetermined activation delay to prevent false alarms due to relatively brief power outages that would cause the monitoring relay to be deenergized. At step 428, if the surge protection modules 40 for all three lines of the power line have not been checked, the program branches back to step 400, and steps 400–428 are repeated for the module 40 protecting the next line.

It should be noted that the manner of determining the weighted average in step 402 via the computer program could be implemented by using a low-pass filter connected to the output of each of the half-wave rectifiers 106. It should further be noted that the comparisons performed at steps 404, 408, 412, and 416 could be implemented in hardware, instead of software, by using four comparators.

Numerous additional modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A surge protection system comprising:
   a first surge protector module adapted to be coupled to a first power line of a multi-phase power line, said first surge protector module having a plurality of surge protection devices, each of said surge protection devices being in either a ready state in which said surge protection device provides surge protection or an inoperable state in which said surge protection device does not provide surge protection, said surge protection devices providing a level of surge protection based upon how many of said surge protection devices are in said ready state and how many of said surge protection devices are in said inoperable state;
   a second surge protector module adapted to be coupled to a second power line of said multi-phase power line, said second surge protector module having a plurality of surge protection devices, each of said surge protection devices being in either a ready state in which said surge protection device provides surge protection or an inoperable state in which said surge protection device does not provide surge protection, said surge protection devices providing a level of surge protection based upon how many of said surge protection devices are in said ready state and how many of said surge protection devices are in said inoperable state;
   means associated with said surge protector modules for generating a signal indicative of said level of surge protection provided by said first and second surge protector modules, said generating means comprising means for comparing a comparison signal indicative of the number of said surge protection devices which are in said ready state with at least one threshold numeric value; and
   means coupled to said generating means for displaying a visual indication of said level of surge protection provided by said first and second surge protector modules.

2. A surge protection system as defined in claim 1 additionally comprising a third surge protector module adapted to be coupled to a third power line of said multi-phase power line, said third surge protector module having a plurality of surge protection devices, each of said surge protection devices being in either a ready state in which said surge protection device provides surge protection or an inoperable state in which said surge protection device does not provide surge protection, said surge protection devices providing a level of surge protection based upon how many of said surge protection devices are in said ready state and how many of said surge protection devices are in said inoperable state.

3. A system as defined in claim 1 wherein said means for generating a signal indicative of said level of surge protection additionally comprises:
   a voltage-sensing circuit that generates a voltage signal relating to the number of said surge protection devices which are in said ready state; and
   means for generating said comparison signal from said voltage signal.

4. A system as defined in claim 1 wherein said comparing means comprises means for comparing said comparison signal with a plurality of thresholds and wherein said means for generating a signal indicative of said level of surge protection comprises:
   a voltage-sensing circuit that generates a voltage signal relating to the number of said surge protection devices which are in said ready state; and
   means for generating said comparison signal from said voltage signal.

5. A surge protection system as defined in claim 4 wherein said voltage-sensing circuit comprises:
   a plurality of resistors for each of said surge protector modules, each of said resistors being associated with a respective one of said surge protection devices;
   a plurality of half-wave rectifiers, each of said half-wave rectifiers being associated with a respective one of said surge protector modules; and
   an A/D converter circuit coupled to said half-wave rectifiers.

6. A surge protection system as defined in claim 4 wherein said means for generating a comparison signal comprises means for generating an average voltage signal.

7. A surge protection system as defined in claim 1 additionally comprising means for generating an alarm when said level of surge protection falls below a threshold value.

8. A surge protection system as defined in claim 1 wherein each of said surge protection devices comprises a metal oxide varistor.

9. A surge protection system comprising:
   a plurality of surge protection devices for the protection of a power line, each of said surge protection devices being in either a ready state in which said surge protection device provides surge protection or an inoperable state in which said surge protection device does not provide surge protection, said surge protection devices providing a level of surge protection based upon how many of said surge protection devices are in said ready sate and how many of said surge protection devices are in said inoperable sate;
   means associated with said surge protection devices for generating a signal indicative of said level of surge protection; and
   means coupled to said generating means for displaying a visual indication of said level of surge protection, said visual indication comprising a numeric value.

10. A system as defined in claim 9 wherein said means for generating a signal indicative of said level of surge protection comprises:
    a voltage-sensing circuit that generates a voltage signal relating to the number of said surge protection devices which are in said ready state;
    means for generating a comparison signal from said voltage signal; and
    means for comparing said comparison signal with a threshold value.

11. A system as defined in claim 9 wherein said means for generating a signal indicative of said level of surge protection comprises:
    a voltage-sensing circuit that generates a voltage signal relating to the number of said surge protection devices which are in said ready state; and
    means for generating a comparison signal from said voltage signal; and
    means for comparing said comparison signal with a plurality of threshold values.

12. A surge protection system as defined in claim 11 wherein said voltage-sensing circuit comprises:
    a plurality of resistors, each of said resistors being associated with a respective one of said surge protection devices;

a half-wave rectifier; and an A/D converter circuit.

13. A surge protection system as defined in claim 11 wherein said means for generating a comparison signal comprises means for generating an average voltage signal.

14. A surge protection system as defined in claim 9 additionally comprising means for generating an alarm when said level of surge protection falls below a threshold value.

15. A surge protection system as defined in claim 9 wherein each of said surge protection devices comprises a metal oxide varistor.

16. A surge protection system comprising:

a plurality of surge protection devices for the protection of a power line, each of said surge protection devices being in either a ready state in which said surge protection device provides surge protection or an inoperable state in which said surge protection device does not provide surge protection, said surge protection devices providing a level of surge protection based upon how many of said surge protection devices are in said ready state and how many of said surge protection devices are in said inoperable state;

means associated with said surge protection devices for generating a signal indicative of said level of surge protection; and means coupled to said generating means for displaying a visual indication of said level of surge protection, said visual indication comprising a percentage value representing the percentage of said surge protection devices that are in said ready state.

17. A system as defined in claim 16 wherein said means for generating a signal indicative of said level of surge protection comprises:

a voltage-sensing circuit that generates a voltage signal relating to the number of said surge protection devices which are in said ready state;

means for generating a comparison signal from said voltage signal; and means for comparing said comparison signal with a threshold value.

18. A system as defined in claim 16 wherein said means for generating a signal indicative of said level of surge protection comprises:

a voltage-sensing circuit that generates a voltage signal relating to the number of said surge protection devices which are in said ready state; and means for generating a comparison signal from said voltage signal; and means for comparing said comparison signal with a plurality of threshold values.

19. A surge protection system as defined in claim 18 wherein said voltage-sensing circuit comprises a plurality of resistors, each of said resistors being associated with a respective one of said surge protection devices, a half-wave rectifier, and an A/D converter circuit.

20. A surge protection system as defined in claim 18 wherein said means for generating a comparison signal comprises means for generating an average voltage signal.

21. A surge protection system as defined in claim 16 additionally comprising means for generating an alarm when said level of surge protection falls below a threshold value.

22. A surge protection system as defined in claim 16 wherein each of said surge protection devices comprises a metal oxide varistor.

23. A surge protection system comprising:

a plurality of surge protection devices for the protection of a power line, each of said surge protection devices being in either a ready state in which said surge protection device provides surge protection or an inoperable state in which said surge protection device does not provide surge protection, said surge protection devices providing a level of surge protection based upon how many of said surge protection devices are in said ready state and how many of said surge protection devices are in said inoperable state;

means associated with said surge protection devices for generating a signal indicative of said level of surge protection, said generating means comprising means for comparing a comparison signal indicative of the number of said surge protection devices which are in said ready state with a plurality of different threshold values; and means coupled to said generating means for displaying a visual indication of said level of surge protection.

24. A system as defined in claim 23 wherein said means for generating a signal indicative of said level of surge protection additionally comprises:

a voltage-sensing circuit that generates a voltage signal relating to the number of said surge protection devices which are in said ready state; and means for generating said comparison signal from said voltage signal.

25. A surge protection system as defined in claim 24 wherein said voltage-sensing circuit comprises a plurality of resistors, each of said resistors being associated with a respective one of said surge protection devices, a half-wave rectifier, and an A/D converter circuit.

26. A surge protection system as defined in claim 23 wherein said means for generating a comparison signal comprises means for generating an average voltage signal.

27. A surge protection system as defined in claim 23 additionally comprising means for generating an alarm when said level of surge protection falls below a threshold value.

28. A surge protection system as defined in claim 23 wherein each of said surge protection devices comprises a metal oxide varistor.

* * * * *